United States Patent [19]
Connett

[11] 4,050,247
[45] Sept. 27, 1977

[54] CONTROL VALVE FOR VARIABLE DISPLACEMENT PUMP OR MOTOR

[75] Inventor: Donald C. Connett, Huntington Beach, Calif.

[73] Assignee: Eaton Corporation, Cleveland, Ohio

[21] Appl. No.: 730,558

[22] Filed: Oct. 7, 1976

[51] Int. Cl.² .................................................. F16H 39/46
[52] U.S. Cl. ........................................ 60/444; 60/488; 137/625.25
[58] Field of Search ............... 60/443, 444, 462, 465, 60/487, 488; 91/462; 137/625, 625.25, 625.42

[56] References Cited
U.S. PATENT DOCUMENTS

| 3,236,049 | 2/1966 | Reinke | 60/444 |
| 3,359,727 | 12/1967 | Hann et al. | 60/444 X |
| 3,585,797 | 6/1971 | Moon | 60/444 |

*Primary Examiner*—Edgar W. Geoghegan
*Attorney, Agent, or Firm*—Teagno & Toddy

[57] ABSTRACT

Modifying the lands of a control spool of a control valve to provide pressurized fluid to the destroking servo when the land covers the destroking servo port. The lands of a control spool are provided with notches to allow fluid to flow from the control pressure port of the control valve to the servo ports of the valve. These notches ensure that a flow of pressurized fluid will be transmitted from the control pressure port to the destroking servo port during return of the swashplate to its neutral position. By providing the notches, pressurized fluid is directed to the destroking port when the land of the control spool covers the destroking servo port. This pressurized fluid helps force via the destroking servo the swashplate back to its neutral position.

6 Claims, 15 Drawing Figures

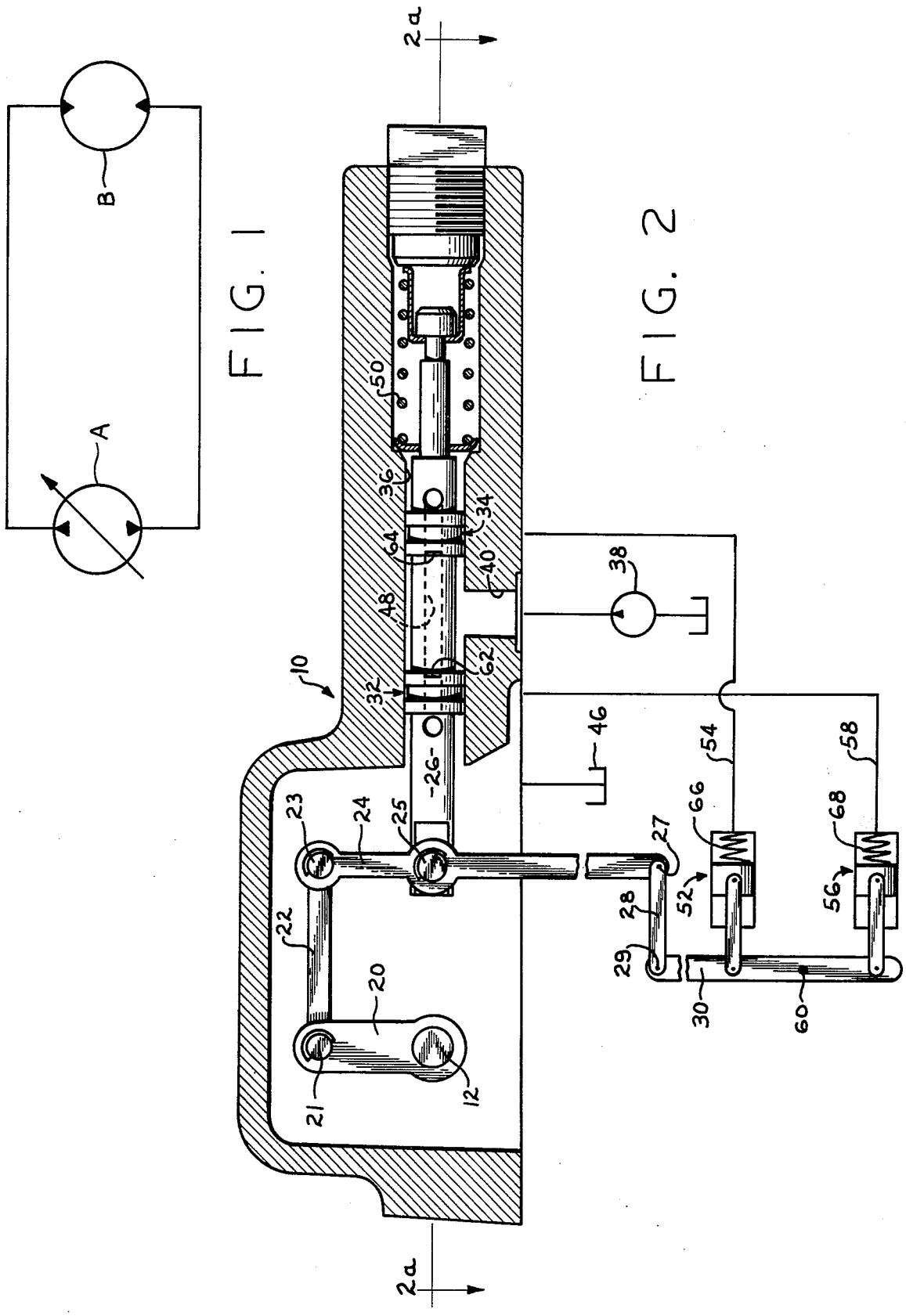

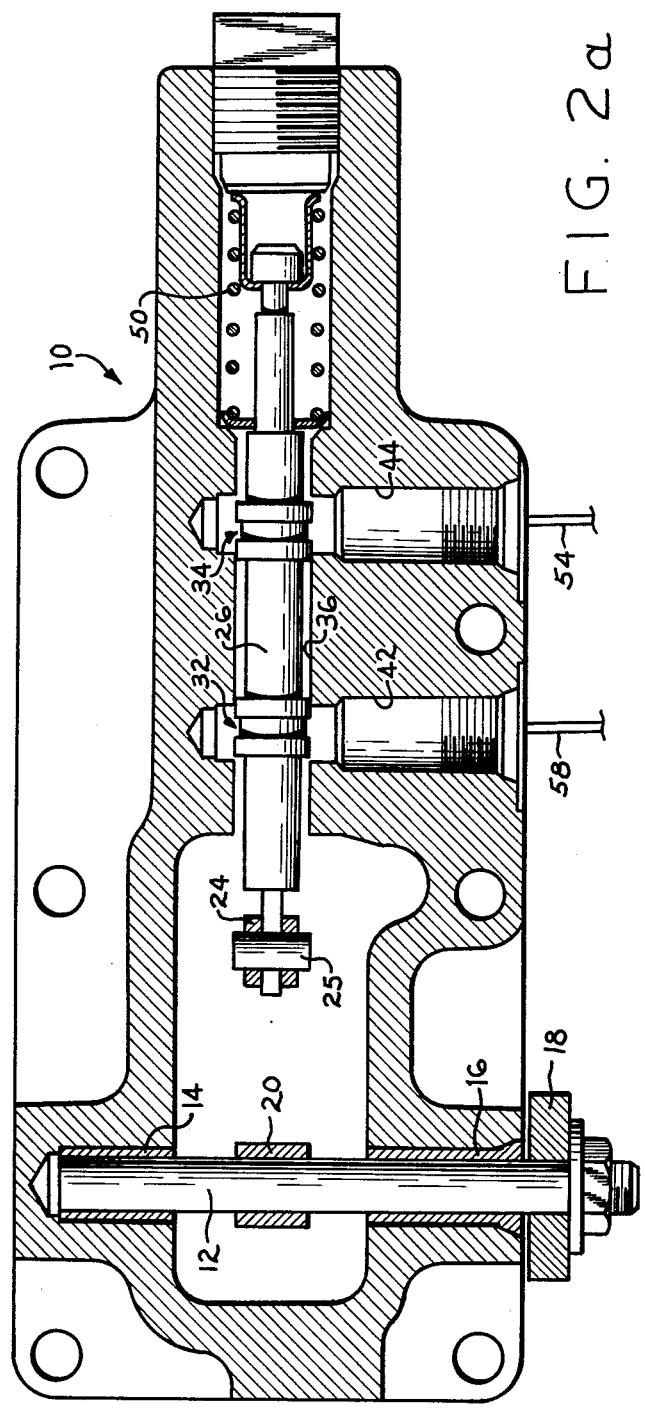

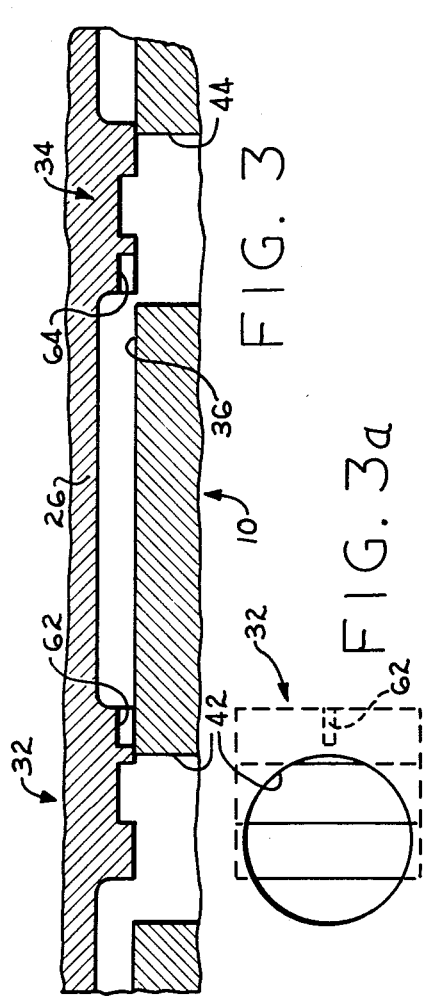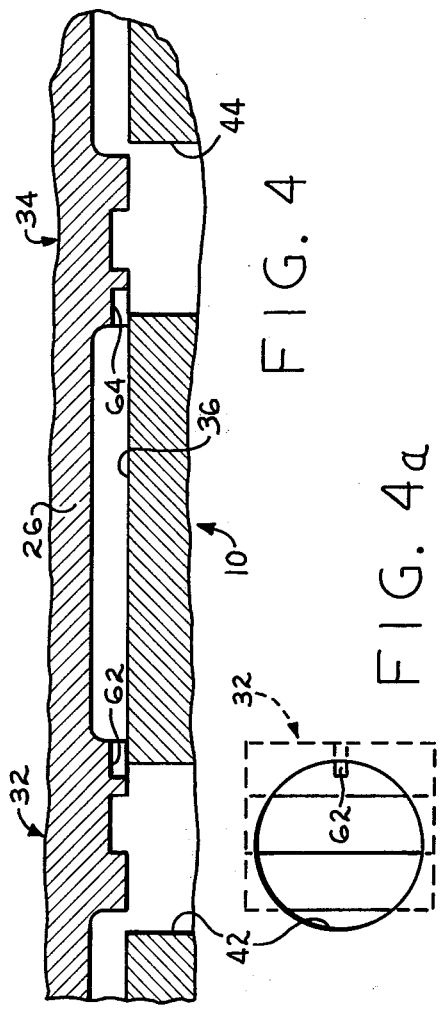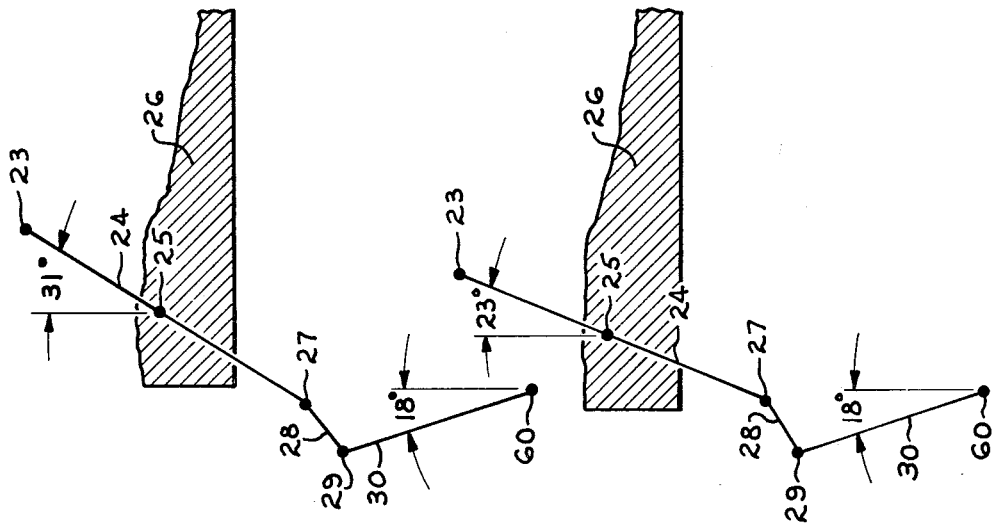

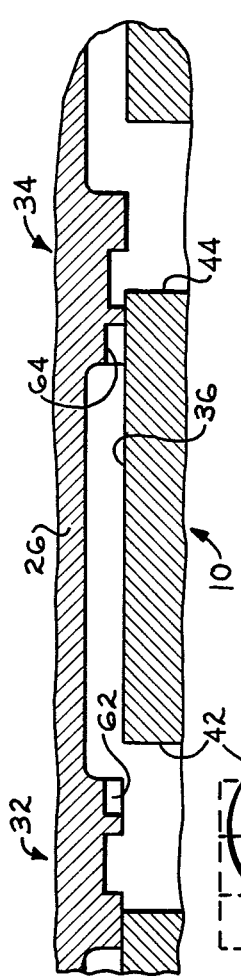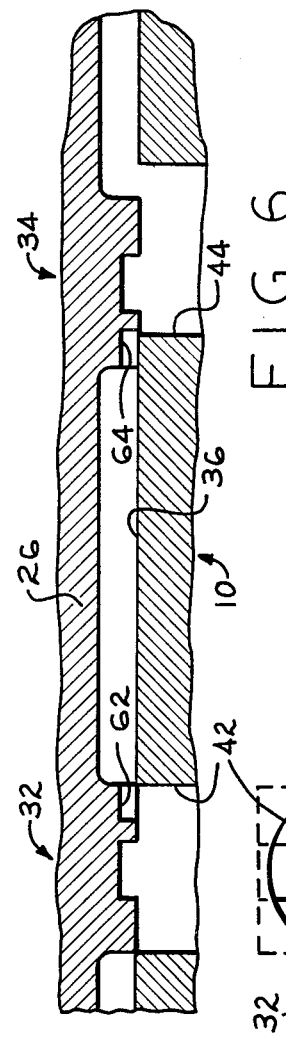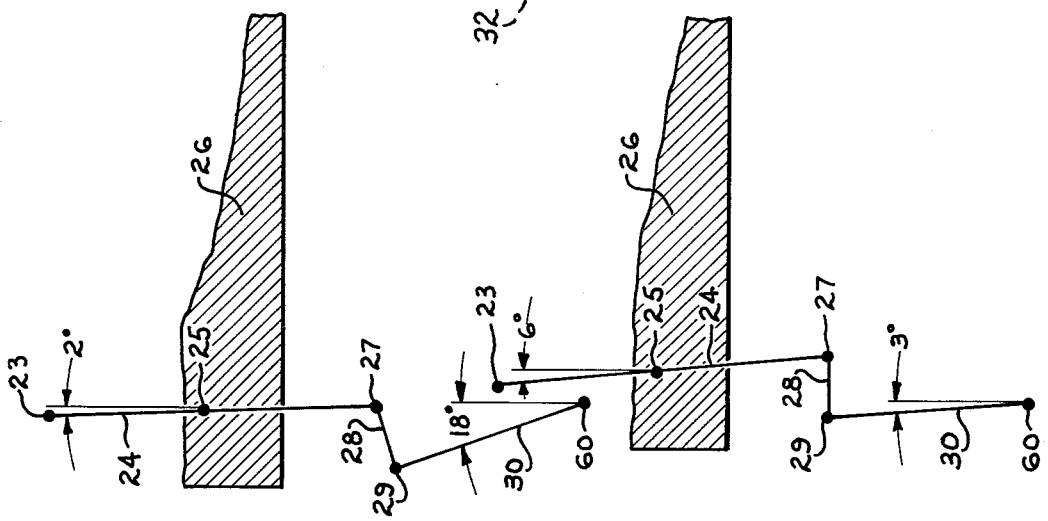
FIG. 5  FIG. 5a  FIG. 6  FIG. 6a

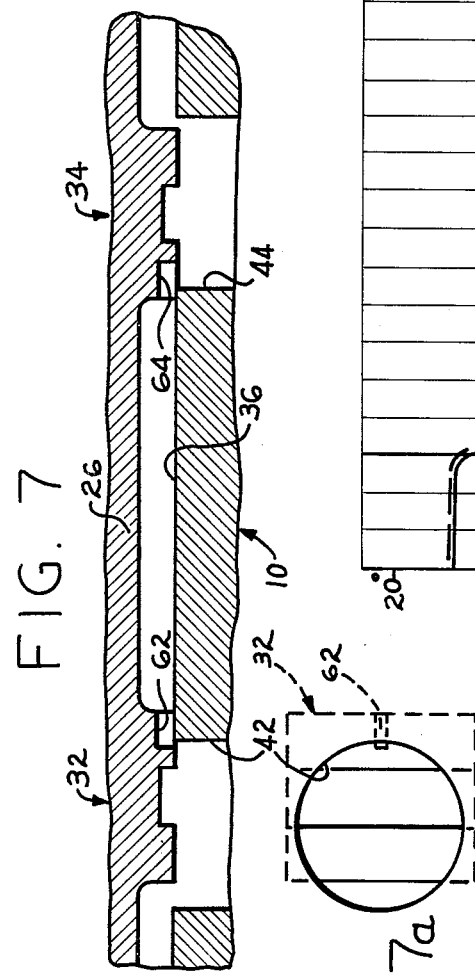
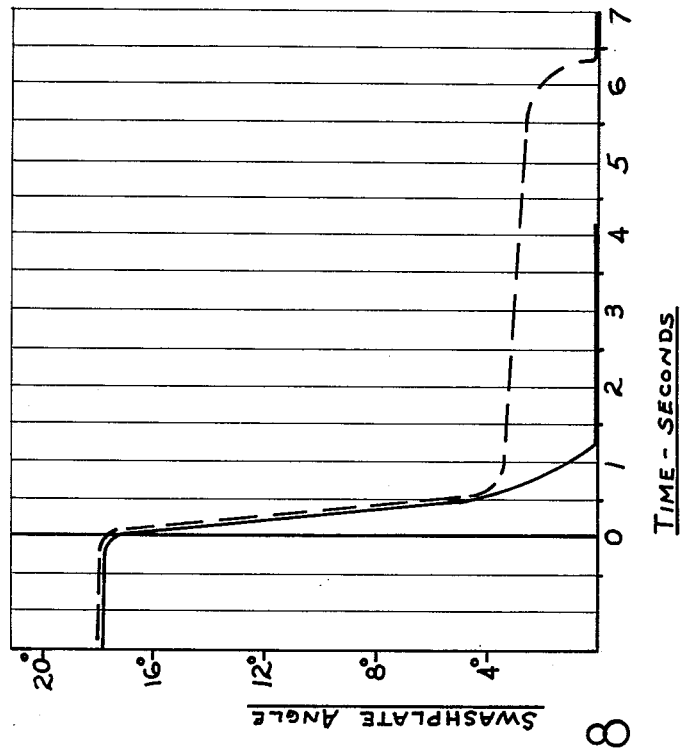
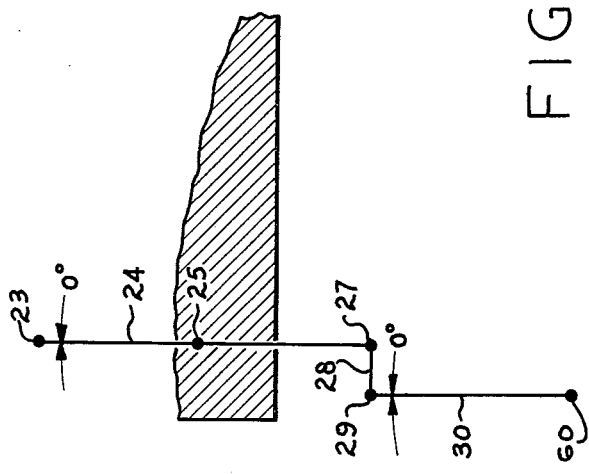
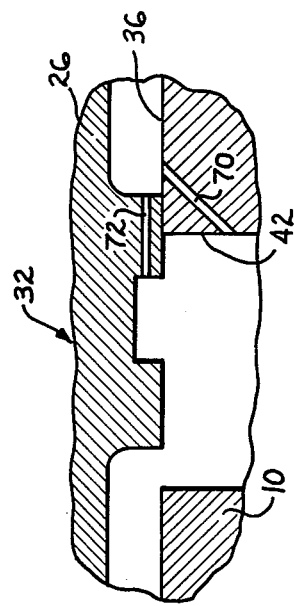

4,050,247

CONTROL VALVE FOR VARIABLE DISPLACEMENT PUMP OR MOTOR

BACKGROUND OF THE DISCLOSURE

It is well known in variable displacement axial piston swashplate pumps and motors to control the position of the swashplate by porting fluid under pressure to one of two servos having pistons attached to the swashplate (the stroking servo) and by porting fluid in the other servo (the destroking servo) to drain. The control of such fluid is governed generally by a control valve having a control spool which has a feedback linkage connection to the swashplate. In such control valves, it has been desired to obtain what is commonly known as a wide band neutral to allow for a substantial degree of control spool movement prior to porting pressurized fluid to the stroking servo. By substantial it is meant that the control handle has to be moved three to four degrees from neutral before fluid is ported to the servo. When a wide band neutral control is used in a variable displacement pump of a hydrostatic transmission for a vehicle, it is possible that in certain unpredictable instances the vehicle could hesitate before coming to a stop when the control lever is rapidly returned to neutral. Sometimes this hesitation is sustained for as long as ten seconds. The hesitation generally exists when the swashplate is rapidly moved from maximum stroke to neutral.

The lands on the control spool in such control valves are generally equal to or wider than the servo ports in the valve. The reason for this is that if the lands are made narrower than the servo ports, interflow leakage can exist between the pressurized fluid and drain. Such interflow leakage can be at an unacceptably high level which will cause an excess of fluid flowing from the charge pump to drain through the control valve thereby reducing the amount of fluid that is available from the charge pump to the closed loop hydrostatic transmission system. It is to the preceding referenced hesitation that applicant's disclosure is directed.

SUMMARY OF THE INVENTION

Applicant determined that because the control spool lands are equal to or wider than the servo ports in the control valve the destroking servo port is blocked entirely when the feedback linkage moves the control spool back toward neutral. If the swashplate inertia, centering moments, servo and springs and/or servo leakage are insufficient to allow the control spool to move on through this blocked position, the swashplate temporarily hangs at this blocked position. The point of the swashplate hangup is governed by the amount of wide band neutral built into the control spool. The greater the wide band neutral, the greater will be the swashplate angle when hang up occurs. With the wide band neutral provided by the assignee of this application, the swashplate generally hangs up at approximately 3°. This can result in the continuation of movement of the vehicle during the hesitation period.

Applicant has discovered that by providing either a fixed or variable orifice between the control pressure port of the control valve and each of the servo ports, the preceding problem can be eliminated. This can be accomplished by providing a relatively small fixed orifice interconnecting the control pressure port and each of the servo ports or, as illustrated in the preferred embodiment of this application, by providing notches within each of the lands to allow for fluid to flow from the control pressure port to the destroking servo port when the land of the control spool covers the destroking servo port. As will be hereinafter described, the notches need only be of a size to ensure that adequate control pressure fluid will be ported to the destroking servo port when the land of the spool substantially covers the destroking servo port. Further, to assure a wide band neutral the opening between each servo port and drain must be at least four times larger than the opening of the notches when the control spool is in neutral if the notch in neutral communicates with each of the servo ports.

BRIEF DESCRIPTION OF THE DRAWINGS

Referring now to the drawings:

FIG. 1 is a schematic view of a hydrostatic transmission.

FIG. 2 illustrates a side elevational view in section of a control valve schematically showing its fluid connection with the servos of the variable displacement axial piston swashplate pump of FIG. 1.

FIG. 2a is a sectional view taken substantially along lines 2a—2a of FIG. 2 illustrating the entire control valve.

FIG. 3 is an enlarged view of a portion of the spool of the control valve illustrated in FIG. 2 showing the spool's connection to the swashplate.

FIG. 3a is a bottom view showing the interrelationship of the destroking servo port of FIG. 3 and the related land of the control spool.

FIGS. 4 through 7 and FIGS. 4a through 7a are respectively similar to FIGS. 3 and 3a showing different positions of the control spool.

FIG. 8 is a graph of swashplate angle vs. time illustrating a rapid return to neutral form maximum stroke of a prior art control valve having the hesitation problem referenced in the background and of a control valve constructed according to the present invention.

FIG. 9 is an enlarged view of an alternate embodiment of the invention.

DETAILED DESCRIPTION OF THE DRAWINGS

1. Description of the Prior Art

FIG. 1 illustrates schematically a hydrostatic transmission for a vehicle. The transmission includes a variable displacement axial piston swashplate pump A driven by a prime mover, not illustrated. The pump is connected via a closed loop circuit with a known hydraulic motor B which is adapted to rotate wheels of a vehicle in a known manner.

Referring now in detail to FIGS. 2 and 2a, a control valve 10 is illustrated to control the displacement of pump A. Valve 10 includes a control shaft 12 mounted in a pair of axially spaced bushings 14 and 16 and projecting out of one side of the valve. A control handle 18 is rigidly secured to control shaft 12 by a key, not illustrated, and a washer and nut. Control shaft 12 is connected by linkage 20, 22 and 24 to a control spool 26. Pivotal connections 21, 23 and 25 are respectively provided between linkage 20 and 22, linkage 22 and 24 and linkage 24 and spool 26. Linkage 24 continues on beyond spool 26 and is pivotedly connected at 27 to linkage 28. Linkage 28 is pivotedly connected at 29 to one end of a swashplate 30 of pump A.

Control spool 26 includes a pair of axially spaced lands 32 and 34 slidably engaged with a spool bore 36 in valve 10. A charge pump 38 is in fluid communication with a control pressure port 40 in valve 10. Port 40 communicates with a reduced center portion of spool 26 intermediate lands 32 and 34. A pair of axially spaced servo ports 42 and 44 communicate with spool bore 36 and are slightly axially spaced outwardly from lands 32 and 34 to ensure that the ports 42 and 44 are in constant communication with bore 36 when spool 26 is in a neutral position as illustrated in FIGS. 2 and 2a. Spool bore 36 is in communication with a drain 46. Spool 26 includes an internally axially extending passage 48 which communicates each end of bore 36 with drain 46. A centering spring assembly 50 is provided in valve 10 to center spool 26 relative to servo ports 42 and 44.

In operation, when control handle 18 is pivoted, linkage 24 pivots about the pivotal connection 27 between linkage 24 and 28 forcing spool 26 either right or left in FIGS. 2 and 2a. Assuming spool 26 moves to the right in FIGS. 2 and 2a, relatively high pressure fluid will be ported from control port 40 by land 34 to servo port 44 and then to a servo 52 via conduit 54. Simultaneously, a servo 56 will be ported via a conduit 58 and servo port 42 by land 32 to drain 46. This will result in the swashplate 30 pivoting about its pivotal point 60 in a counterclockwise direction in FIG. 2. Such pivotal movement moves pivotal point 27 to the left in FIG. 2 returning spool 26 to a metering position which results in swashplate 30 maintaining a given position which is determined by the angular position of control handle 18.

In FIG. 3, spool 26 is shown in a metering position maintaining an 18° angle of swashplate 30 relative to the neutral position of swashplate 30 illustrated in FIG. 2. In this position, linkage 24 has moved through an angle of 31°. Spool 26 in its metering position will continue to move back and forth in order to either port fluid to servo 52 or reduce the fluid pressure in servo 52 to maintain the 18° angle.

It is assumed that for the prior art portion of the description, notches 62 and 64 respectively on lands 32 and 34 do not exist. It is further assumed that for the entire description the width of each land 32, 34 is equal to or greater than, by as much as eight thousands (0.008) of an inch, the diameter of the respective circular servo ports 42 and 44.

As land 34 is metering fluid to servo 52, servo 56 is maintained in constant communication with drain 46. Upon rapid movement of control handle 18 to its neutral position, linkage 24 will be drawn back toward the position illustrated in FIG. 2. Assuming such movement takes only a fraction of a second, swashplate 30 will continue to maintain an 18° angle relative to its neutral position until the control handle reaches its neutral position.

FIGS. 4 and 4a illustrate the beginning of the movement of spool 26 to the left in response to movement of control handle 18 to its neutral position. In FIGS. 4 and 4a, servo port 44 is now beginning communication with drain thereby allowing centering spring 68 in servo 56 to help force swashplate 30 back to neutral. The inertia of the axial piston variable displacement swashplate pump may also tend to return swashplate 30 to the neutral position illustrated in FIG. 2. As spool 26 continues to move in response to movement of lever 18 to its neutral position, the spool will eventually reach the position illustrated in FIGS. 5 and 5a. In this position, control fluid under pressure is being ported to destroking servo 56 while servo 52 is completely ported to drain. Fluid ported to destroking servo 56 will be driving swashplate 30 back to the neutral position illustrated in FIG. 2. This driving force may be aided by the inertia of swashplate 30 and the centering spring 68.

As swashplate 30 begins to move back to its neutral position, it eventually reaches a position wherein spool 26 is moved to the position illustrated in FIGS. 6 and 6a. At this position, the swashplate is approximately 3° away from its neutral position. Three degrees is substantial enough to cause continuation in the pumping of fluid from pump A to motor B. Since land 32 is equal to or slightly larger than the diameter of servo port 42, fluid will be prevented from flowing from control pressure port 40 to servo 56, thus trapping the fluid in servo 56 and conduit 58. In the absence of substantial leakage in servo 56, further movement of swashplate 30 toward its neutral position will result in a drawing of a vacuum within servo 56 and conduit 58. Since spring 68 is only adequate enough to provide a slight biasing force at this 3° position, it is possible and, in fact, some times occurs that swashplate 30 will hang up at this position for a period of time up to ten seconds before further movement is achieved. Once sufficient leakage occurs in destroking servo 56 to reduce the drawn vacuum, spool 26 will continue to move to the position illustrated in FIGS. 7 and 7a thus returning swashplate 30 to neutral and returning the control valve and pump to the position illustrated in FIGS. 2 and 2a.

FIG. 8, the dash lines illustrate a graph of the swashplate angle vs. time in seconds for the return of a hung up swashplate to move from full stroke (18° swashplate angle) to neutral in response to a rapid return of lever 18 to neutral. As illustrated in the graph, the hang up occurs at approximately 3° to 4°.

2. Description of the Preferred Embodiment

Applicant recognized the cause for the preceding referenced hang up problem and has provided a simple and inexpensive solution therefor. It is to this solution which the attached claims are drafted. In viewing FIG. 2, applicant has provided notches 62 and 64 respectively on lands 32 and 34. As best seen in FIGS. 7 and 7a, when spool 26 is in the neutral position, these notches provide fluid communication between control pressure port 40 and servo ports 42 and 44. As seen in FIG. 7a, the amount of fluid permitted to flow from control pressure port 40 to servo port 42 through notch 62 is relatively small when compared to the opening between servo port 42 and drain 46. Although only port 42 is illustrated in 7a, it should be recognized that the arrangement for port 44 would be identical to that of 42. In the neutral position, it is necessary that the area to drain 46 be at least four times the area of notch 62 and preferably on the order of eight to nine times the area of notch 62. This will ensure that fluid pressure will not build up in servos 52 and 56 causing one of the servos to move swashplate 30 to an actuated position when spool 26 is in neutral. In the disclosed arrangement, charge pump 38 provides a pressure of approximately 200 psi. Springs 66 and 68 bias servos 52 and 56 with a force equivalent to approximately 15 psi. It is, accordingly, desired in this embodiment to maintain the fluid pressure in conduits 54 and 58 to a value below the 15 psi provided by springs 66 and 68. Of course, these values will change with variations in the size of springs 66 and 68.

In viewing FIGS. 3 and 3a, notch 64 provides for an additional amount of fluid flow into servo 52. Spool 26 in FIGS. 3 and 3a could, accordingly be moved slightly to the left in FIGS. 3 and 3a during metering. Since there is at least line to line contact between lands 32 and 34 of the spool and servo ports 42 and 44, slight movement of spool 26 will result in servo 52 being ported either to the pressure of the fluid from control pressure port 40 or to drain 46. The operation of spool 26 over that referenced for the prior art is not materially affected with reference to FIGS. 4, 4a, 5 and 5a. However, in FIGS. 6 and 6a, it can be seen that when land 32 completely covers servo port 42, fluid will still be supplied from control pressure port 40 to servo 56 via notch 62. The pressure of the fluid, along with any force that may be exerted on swashplate 30 due to its inertia and the force of spring 68 will be significant enough to continue the movement of swashplate 30 to move land 32 across the blocked position and into the neutral position illustrated in FIGS. 7 and 7a.

As is illustrated in FIG. 8, in the solid lines, the addition of notch 62 results in swashplate 30 returning to neutral at a relatively rapid rate when compared to the swashplate of the prior art device. This rapid return can be directly related to the presence of notch 62 in land 32 and the continued flow of control pressure fluid into destroking servo 56 during movement of swashplate 30 from maximum stroke to neutral. As previously noted, without notch 62, land 32 may, in some instances, completely block servo port 42, thus preventing fluid to flow into servo 56 resulting in a temporary hang up of swashplate 30.

Notch 62 should be of sufficient size to ensure a flow of fluid into destroking servo 56 when land 32 covers servo port 42. Operation of the disclosed control valve and pump is identical for opposite actuation of control spool 26.

3. Description of Alternate Embodiments

FIG. 9 shows another embodiment of the invention wherein a constant area orifice 70 is provided between the reduced center portion of spool 26 and servo port 42 and another constant area orifice 72 is provided in spool 26. In this embodiment, the areas of orifices 70 and 72 are relatively small when compared to the area of servo port 42 open to drain 46 in the neutral position of control spool 26. In the alternative, either orifice 70 or orifice 72 may be eliminated. Of course, in each of these latter embodiments, a similar orifice or orifices would also be provided to communicate control pressure port 40 with servo port 44.

The problem which applicant has recognized is that of the blocking of the servo port during return of the swashplate to neutral. The solution which he has provided is that of porting pressurized fluid to the destroking servo port during return of swashplate 30 to neutral. This solution can also be used to advantage when the width of lands 32 and 34 are slightly less than the diameter of the respective servo ports 42 and 44. Although the hang up problem would not be as great under these conditions, it would, however, still exist and the disclosed concept would provide an extremely advantageous method of assuring rapid return of swashplate 30 to neutral in response to rapid return of lever 18 to neutral.

I claim:

1. A control valve for use with a hydraulic pump or motor having a swashplate movable from a neutral position to an actuated position to vary the displacement of said pump or motor in response to the porting of fluid from a relatively high pressure fluid source to one servo attached to the swashplate and the porting of fluid from another servo attached to the swashplate to a relatively low pressure fluid source, the control valve comprising:
   a. a housing defining an axially extending spool bore;
   b. a control spool located within said spool bore and having a pair of axially spaced lands engaging said spool bore, a reduced center portion intermediate said lands and spaced from said spool bore, and a pair of reduced end portions axially outwardly from said lands and spaced from said spool bore, each of said lands having a given axial width defined by an axially outer edge adjacent said respective reduced end portion and an axially inner edge adjacent said reduced center portion;
   c. means to center said control spool relative to a given position within said spool bore;
   d. linkage connected to said control spool and to said swashplate to move said control spool in response to movement of said swashplate;
   e. a movable control handle;
   f. linkage connected to said control spool and to said control handle to move said control spool in response to movement of said control handle;
   g. a controlled pressure port in said housing adapted for fluid communication with said relatively high pressure fluid source and in fluid communication with said spool bore intermediate said lands when said control spool is centered;
   h. means fluidly communicating said portion of said spool bore encircling said reduced end portions of said control spool with said relatively low pressure fluid source;
   i. a first servo port in said housing adapted for fluid communication with one of said servos and in fluid communication with said spool bore at a position axially spaced in one direction from said controlled pressure port, said one servo port being partially covered by one of said lands when said control spool is centered;
   j. a second servo port in said housing adapted for fluid communication with the outer of said servos and in fluid communication with said spool bore at a position axially spaced in the other direction from said controlled pressure port, said other servo port being partially covered by said other and when said control spool is centered; and
   k. means providing fluid communication between said controlled pressure port and each of said servo ports, said fluid communication being provided via an orifice which has an area that is no greater than one-fourth of the area of the respective servo port which is not covered by the respective land when said control spool is centered.

2. A control valve according to claim 1 wherein said means providing fluid communication comprises at least one notch within each of said lands, each of said notches being in fluid communication with the reduced center portion of said control spool and the respective servo port when said control spool is moved to a position wherein the respective land is centered relative to the center of the respective servo port.

3. A control valve according to claim 1 wherein the axial width between the axially inner edge and the axially outer edge of each land is equal to or greater than the axial width of the respective servo port whereby said land will completely cover said servo port when said land is centered relative to said servo port.

4. A control valve for use with a hydraulic pump or motor having a swashplate movable from a neutral position to an actuated position to vary the displacement of said pump or motor in response to the porting of fluid from a relatively high pressure fluid source to one servo attached to the swashplate and the porting of fluid from another servo attached to the swashplate to a relatively low pressure fluid source, the control valve comprising:

a. a housing defining an axially extending spool bore;

b. a control spool located within said spool bore and having a pair of axially spaced lands engaging said spool bore, a reduced center portion intermediate said lands and spaced from said spool bore, and a pair of reduced end portions axially outwardly from said lands and spaced from said spool bore, each of said lands having a given axial width defined by an axially outer edge adjacent said respective reduced end portion and an axially inner edge adjacent said reduced center portion;

c. means to center said control spool relative to a given position within said spool bore;

d. linkage connected to said control spool and to said swashplate to move said control spool in response to movement of said swashplate;

e. a movable control handle;

f. linkage connected to said control spool and to said control handle to move said control spool in response to movement of said control handle;

g. a controlled pressure port in said housing adapted for fluid communication with said relatively high pressure fluid source and in fluid communication with said spool bore intermediate said lands when said control spool is centered;

h. means fluidly communicating said portion of said spool bore encircling said reduced end portions of said control spool with said relatively low pressure fluid source;

i. a first servo port in said housing adapted for fluid communication with one of said servos and in fluid communication with said spool bore at a position axially spaced in one direction from said controlled pressure port, said one servo port being partially covered by said one land when said control spool is centered;

j. a second servo port in said housing adapted for fluid communication with the other of said servos and in fluid communication with said spool bore at a position axially spaced in the other direction from said controlled pressure port, said other servo port being partially covered by said other land when said control spool is centered; and k. at least one notch within each of said lands, each of said notches being in fluid communication with the reduced center portion of said control spool and the respective servo port when said control spool is axially moved to a position wherein the respective land covers the respective servo port.

5. A control valve according to claim 4 wherein:

l. said notches are in constant fluid communication with said reduced center portion of said control spool and with their respective servo ports when said control spool is centered;

m. each of said lands cover only a portion of a servo port when said control spool is centered, said portion of each of said servo ports is the portion which is axially closest to the controlled pressure port; and n. the maximum cross sectional area of each of said notches providing fluid communication between said reduced center portion annd each of the respective servo ports is at least less than one-fourth of the maximum area of the uncovered portion of each of said servo ports when said control spool is centered.

6. A control valve according to claim 4 wherein:

l. the axial width of said one servo port being equal to or less than the axial width of one of said lands whereby said one land will completely cover said one servo port when said control spool is axially moved; and m. the axial width of said other servo port being equal to or less than the axial width of said other land whereby said other land will completely cover said other servo port when said control spool is axially moved.

* * * * *